(12) United States Patent
Toriumi

(10) Patent No.: US 9,944,179 B2
(45) Date of Patent: Apr. 17, 2018

(54) CENTER CONSOLE

(71) Applicant: CALSONIC KANSEI CORPORATION, Saitama (JP)

(72) Inventor: Takahiro Toriumi, Saitama (JP)

(73) Assignee: CALSONIC KANSEI CORPORATION, Saitama (JP)

( * ) Notice: Subject to any disclaimer, the term of this patent is extended or adjusted under 35 U.S.C. 154(b) by 0 days.

(21) Appl. No.: 15/314,425

(22) PCT Filed: May 21, 2015

(86) PCT No.: PCT/JP2015/064550
§ 371 (c)(1),
(2) Date: Nov. 28, 2016

(87) PCT Pub. No.: WO2015/182465
PCT Pub. Date: Dec. 3, 2015

(65) Prior Publication Data
US 2017/0190250 A1    Jul. 6, 2017

(30) Foreign Application Priority Data

May 28, 2014    (JP) .................................. 2014-110568

(51) Int. Cl.
*B60K 20/02* (2006.01)
*B60R 7/04* (2006.01)
(Continued)

(52) U.S. Cl.
CPC ......... *B60K 20/02* (2013.01); *B60H 1/00564* (2013.01); *B60H 1/246* (2013.01);
(Continued)

(58) Field of Classification Search
CPC . B60K 20/02; B60H 1/246; B60R 2011/0007; B60R 13/0262
(Continued)

(56) References Cited

U.S. PATENT DOCUMENTS 8,573,350 B2 * 11/2013 Abro .................... B60R 13/0892
180/315
2013/0057010 A1 * 3/2013 Vasko ....................... B60R 7/04
296/24.34
(Continued)

FOREIGN PATENT DOCUMENTS

JP            6-71251 U       10/1994
JP      2000272330 A  *  3/1999 ............... B60H 1/00
(Continued)

OTHER PUBLICATIONS

International Search Report and Written Opinion of the International Search Report for PCT/JP2015/064550 dated Aug. 11, 2015.

*Primary Examiner* — Jason S Morrow
(74) *Attorney, Agent, or Firm* — Kenealy Vaidya LLP

(57) ABSTRACT

To secure and improve the support rigidity of an electric AT device without any structural difficulty.
A center console includes a console body which has a pair of side wall parts, and an AT finisher which is provided between upper ends of the pair of side wall parts. An electric AT device is mounted on a lower surface side of the AT finisher directly or through a mounting bracket. A rigid member is mounted in at least one inner surface of the pair of side wall parts. A device holding part which is supported by an upper portion of the rigid member is provided in the mounting bracket or the electric AT device.

3 Claims, 4 Drawing Sheets

(51) Int. Cl.
*B60H 1/00* (2006.01)
*B60H 1/24* (2006.01)
*B60R 13/02* (2006.01)

(52) U.S. Cl.
CPC ............ *B60R 7/04* (2013.01); *B60R 13/0206* (2013.01); *B60R 13/0262* (2013.01); *B60H 2001/002* (2013.01); *B60R 2013/0287* (2013.01)

(58) Field of Classification Search
USPC ...................................................... 296/24.34
See application file for complete search history.

(56) References Cited

U.S. PATENT DOCUMENTS

| | | | | |
|---|---|---|---|---|
| 2013/0257077 | A1* | 10/2013 | Porcs | B60R 13/0206 296/24.34 |
| 2015/0101448 | A1* | 4/2015 | Nakanishi | B60K 20/02 74/522.5 |
| 2016/0101692 | A1* | 4/2016 | Chen | B60K 20/02 296/24.34 |
| 2016/0257266 | A1* | 9/2016 | Buza | B60R 13/0206 |
| 2017/0204965 | A1* | 7/2017 | Niwa | F16H 59/0278 |

FOREIGN PATENT DOCUMENTS

| | | |
|---|---|---|
| JP | 2008-74224 A | 4/2008 |
| JP | 2008-80887 A | 4/2008 |
| JP | 2009-51478 A | 3/2009 |
| JP | 2009-166599 A | 7/2009 |

* cited by examiner

CENTER CONSOLE

This application is a U.S. national phase filing under 35 U.S.C. §371 of PCT Application No. PCT/JP2015/064550, filed on May 21, 2015, and claims priority under 35U.S.C. §119 to Japanese patent application number JP2014-110568 filed on May 28, 2014, the entireties of which are incorporated herein by reference.

TECHNICAL FIELD

The present invention relates to a center console.

BACKGROUND ART

A vehicle such as an automobile is provided with a center console at a position between a driver seat and a passenger seat in a front portion in a cabin (for example, see Patent Document 1).

The center console includes, for example, a shift lever in a front portion, a cup holder in an intermediate portion, and a console box in a rear portion.

The center console includes mainly a console body having a pair of side wall parts. An AT finisher is provided between the upper ends of the pair of side wall parts in the front portion of the console body. The AT finisher is a decorative panel having an opening for passing the shift lever.

RELATED DOCUMENTS

Patent Documents

SUMMARY OF THE INVENTION

Problems That the Invention is to Solve

However, the center console has a following problem.

That is, in a case where the shift lever is provided in a mechanical AT device, the mechanical AT device is supported and fixed by a floor of the vehicle body, and thus, no problem occurs particularly in the support rigidity of the mechanical AT device.

With respect to this, recently, an electric AT device has been spreading in which an AT device is separated from a transmission and both are electrically connected. The electric AT device is directly mounted in the AT finisher in the state of being supported by the floor of the vehicle body. For this reason, it is hard to secure the support rigidity of the electric AT device.

In this regard, a main object of the present invention is to solve the above problem.

Means for Solving the Problems

In order to solve the above problem, the present invention is to provide a center console including: a console body which has a pair of side wall parts, and an AT finisher which is provided between upper ends of the pair of side wall parts of the console body, in which an electric AT device is mounted on a lower surface side of the AT finisher directly or through a mounting bracket, a rigid member is mounted in at least one inner surface of the pair of side wall parts, and a device holding part which is supported by an upper portion of the rigid member is provided in the mounting bracket or the electric AT device.

Advantages of the Invention

With the above configuration of the present invention, it is possible to secure and improve the support rigidity of the electric AT device without any structural difficulty.

MODES FOR CARRYING OUT THE INVENTION

Hereinafter, this embodiment will be described in detail with reference to the drawings. FIGS. 1 to 4 illustrate this embodiment.

First Example

<Configuration>

Hereinafter, the configuration of the example will be described.

Figure 1:
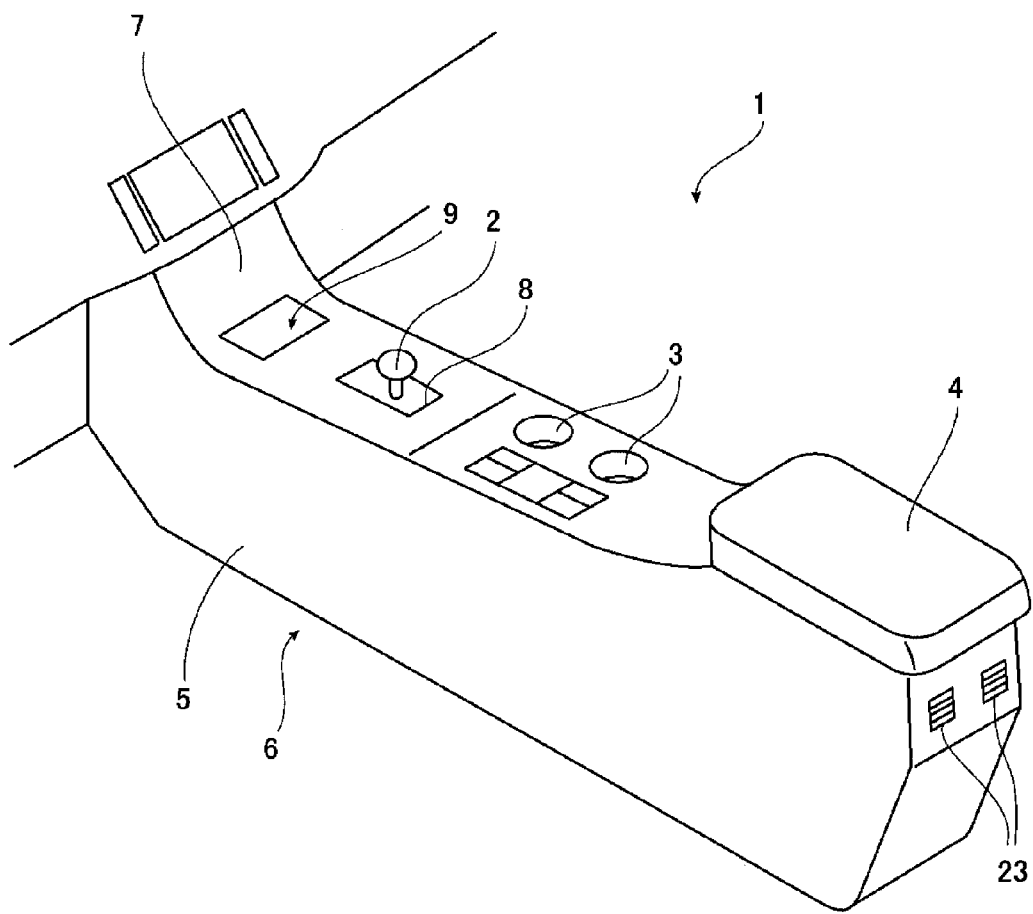
FIG. 1 is an overall perspective view of a center console according to an example of this embodiment.

A vehicle such as an automobile is provided with a center console 1, which is illustrated in an overall perspective view of FIG. 1, at a position between a driver seat and a passenger seat in a front portion in a cabin.

The center console 1 includes, for example, a shift lever 2 in a front portion, a cup holder 3 in an intermediate portion, and a console box 4 in a rear portion. However, the configuration of the center console 1 is not limited thereto.

Figure 2:
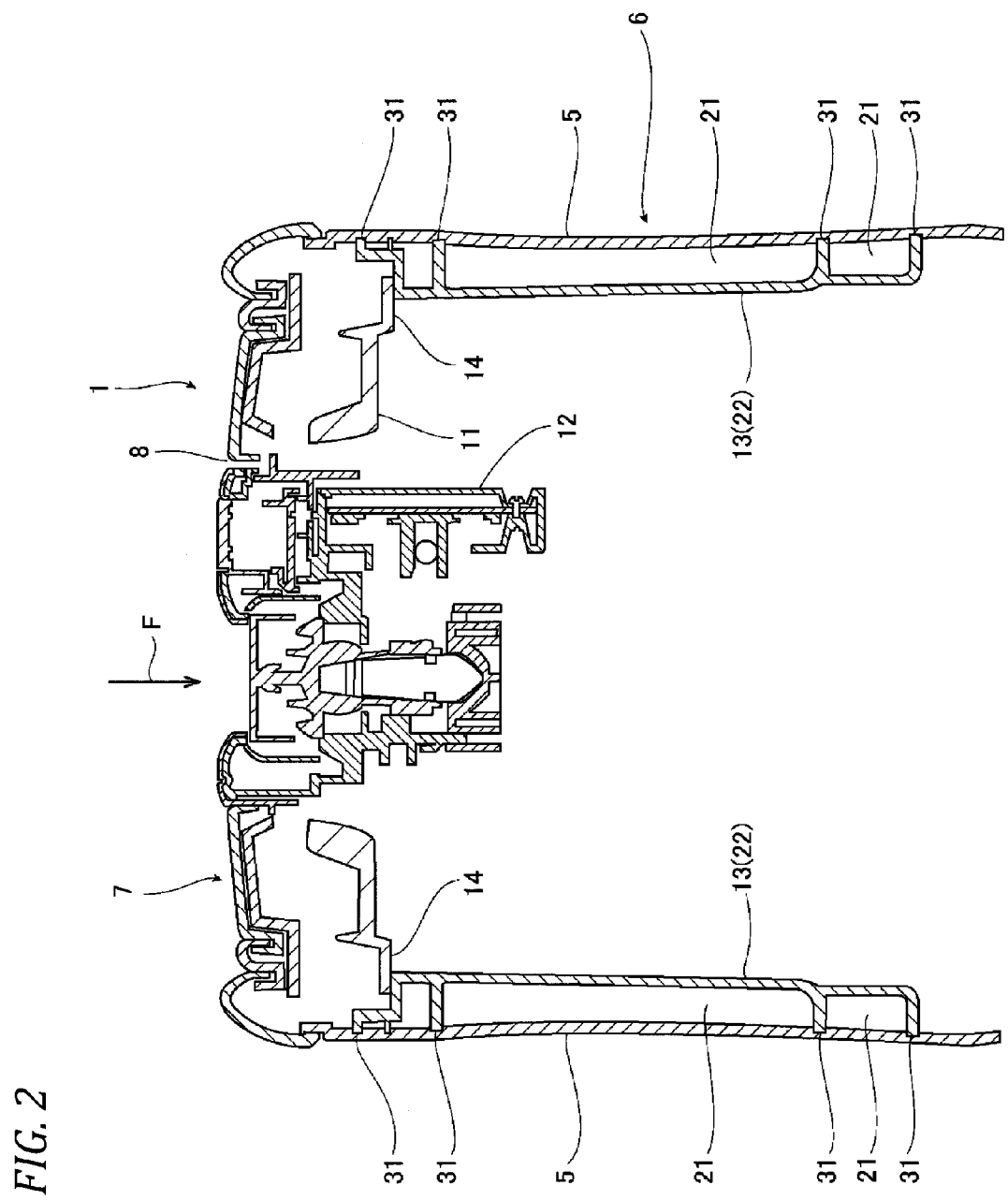
FIG. 2 is a longitudinal sectional view of a front portion of the center console of FIG. 1.

As illustrated in a longitudinal sectional view of FIG. 2, the center console 1 includes mainly a console body 6 having a pair of side wall parts 5. An AT finisher 7 is provided between the upper ends of the pair of side wall parts 5 in the front portion of the console body 6.

Figure 3:
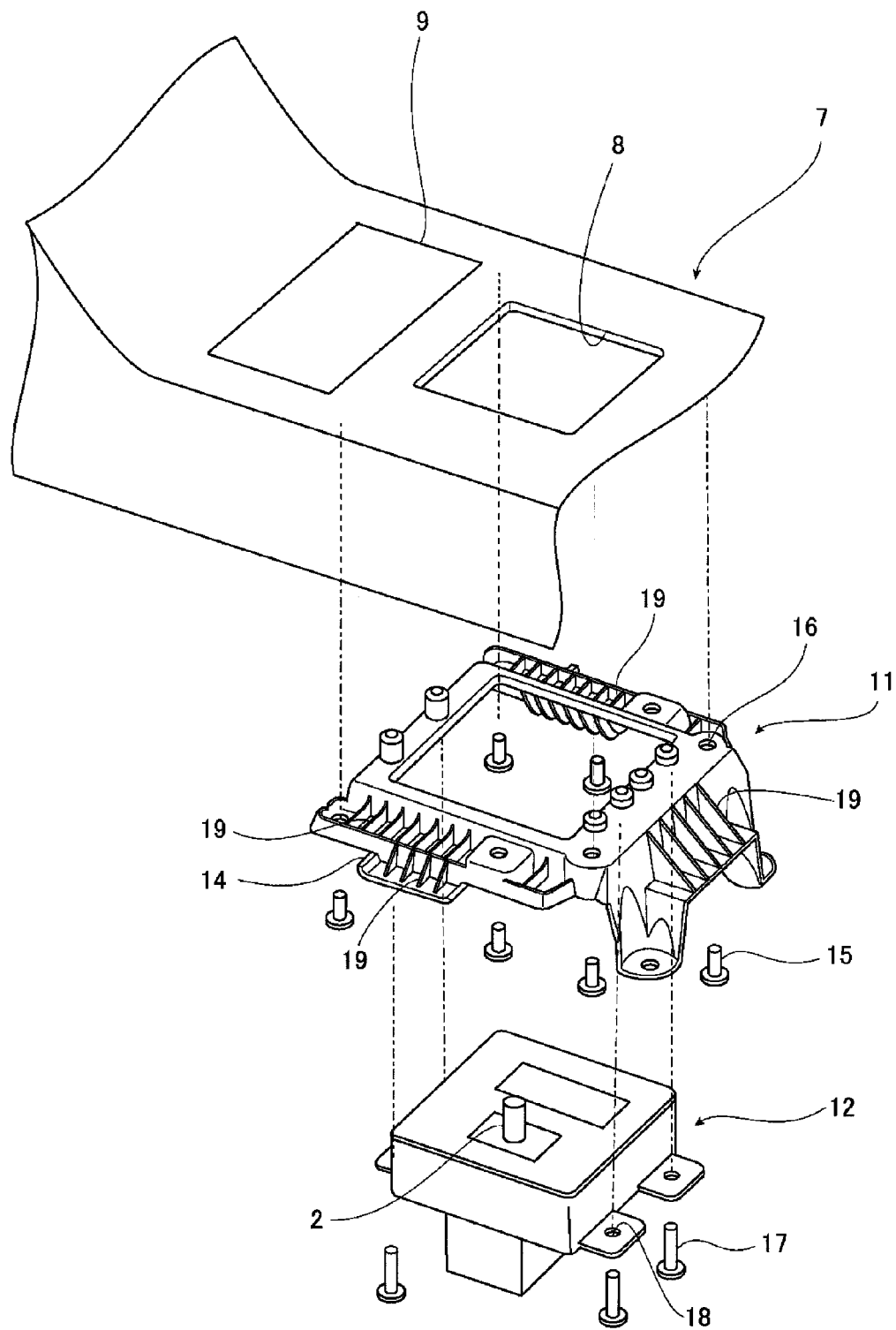
FIG. 3 is an exploded perspective view of the front portion of the center console of FIG. 1.

Herein, as illustrated in an exploded perspective view of FIG. 3, the "AT finisher 7" is a decorative panel having an opening 8 for passing at least the shift lever 2. A tray 9 or the like is provided in the front portion of the AT finisher 7, for example.

As for the above basic configuration, this example has a following configuration.

(1) An electric AT device 12 is mounted on the lower surface side of the AT finisher 7 directly or through a mounting bracket 11.

As illustrated in FIG. 2, a rigid member 13 is mounted in at least one inner surface of the pair of side wall parts 5.

Contrary thereto, a device holding part 14 which is supported by the upper portion of the rigid member 13 is provided in the mounting bracket 11 or the electric AT device 12.

Herein, as illustrated in FIG. 3, the "mounting bracket 11" has almost rectangular frame shape in plan view. The mounting bracket 11 may have a three-dimensional shape with a horizontal frame portion and a vertical frame portion, for example. A mounting hole 16 for mounting on the back surface of the AT finisher 7 by using a fastener 15 is provided in the rectangular frame shaped mounting bracket 11. However, the configuration of the mounting bracket 11 is not limited thereto.

The "electric AT device 12" can be disposed to be inserted into the rectangular frame shaped mounting bracket 11. A mounting hole 18 for mounting on the back surface of the mounting bracket 11 by using a fastener 17 is provided in the vicinity of the electric AT device 12.

As illustrated in FIG. 2, the "rigid member 13" has a height that reaches the lower surface of the device holding part 14. In this case, the rigid member 13 is provided in both side portions of the console body 6. The "device holding part 14" is a locking piece which integrally protrudes sideward from the side portion of the rectangular frame shaped mounting bracket 11 or the electric AT device 12. The device holding part 14 may be provided in at least one or both of the mounting bracket 11 and the electric AT device 12. In this case, the device holding part 14 is provided in the both side portions of the mounting bracket 11. As illustrated in FIG. 3, a reinforcing rib 19 is appropriately provided in the mounting bracket 11 or between the mounting bracket 11 and the device holding part 14 for securing and improving strength.

(2) As illustrated in FIG. 2, the rigid member 13 serves as a duct member 22 which forms an air-conditioning air passage 21 extending in a front and rear direction of a vehicle between the duct member 22 and the inner surface of the side wall part 5.

Herein, the "duct member 22" has a surface almost parallel with the side wall part 5, and is mounted in the side wall part 5 to be formed into a closed cross section. Accordingly, the console body 6 is formed of a reinforcing body having a double wall structure. The duct member 22 sends, for example, the air-conditioning air to a rear seat. In a case where the duct members 22 are provided in the both side portions of the console body 6, the duct members 22 are used to adjust a temperature independently in each of right and left side portions. With respect thereto, as illustrated in FIG. 1, an air outlet 23 for rear seat is provided in the back surface of the center console 1.

(3) The duct member 22 has a deposition rib 31, which can be subjected to vibration deposition with respect to the inner surface of the side wall part 5, in at least upper and lower edge portions.

Herein, the "deposition rib 31" extends toward the inner surface of the side wall part 5. The sectional area of the air-conditioning air passage 21 is set depending on the protruding height of the deposition rib 31. An additional deposition rib 31 is provided in a position between the upper and lower edge portions of the side wall part 5, so that the air-conditioning air passage 21 can be partitioned to a plurality of small passages. The small passages plurally partitioned can be used, for example, to adjust a head temperature, a breast temperature, a leg temperature and the like of a rear-seat occupant.

<Effect>

With this the example, it is possible to obtain following effects.

(1) The electric AT device 12 is mounted directly or through the mounting bracket 11 on the lower surface side of the AT finisher 7 provided between the upper ends of the pair of side wall parts 5 of the console body 6. Accordingly, the electric AT device 12 can be mounted in the console body 6 without any structural difficulty.

The device holding part 14 provided in the mounting bracket 11 or the electric AT device 12 is supported by the upper portion of the rigid member 13 mounted on the inner surface of the side wall part 5 of the console body 6. Accordingly, it is possible to secure and improve the support rigidity of the electric AT device 12 with respect to load F from above and the like without any structural difficulty. It is possible to largely secure the inner space of the console body 6.

Figure 4:
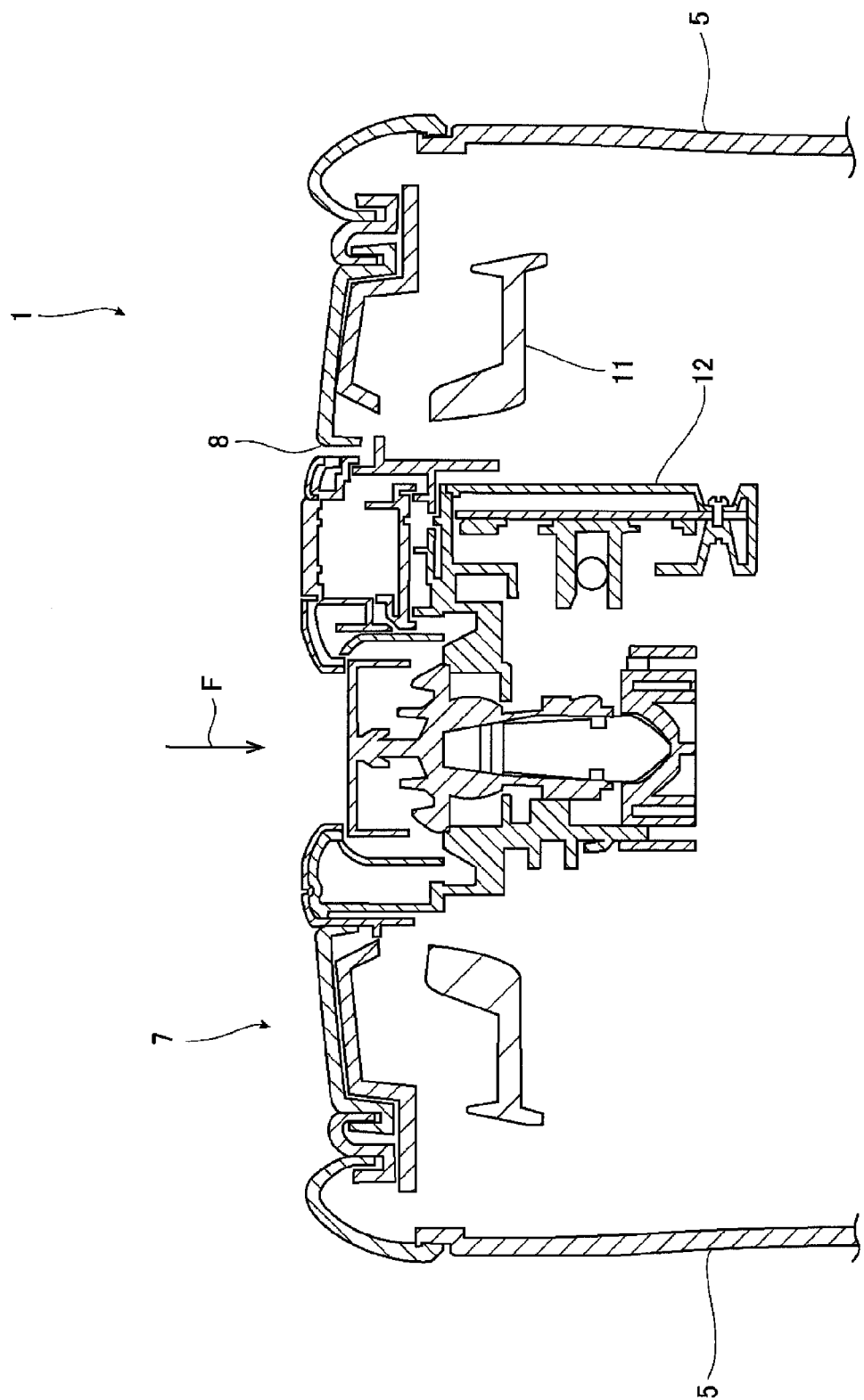
FIG. 4 is a longitudinal sectional view of the front portion of the center console in the case of not providing a device holding part.

Contrary thereto, as illustrated in FIG. 4, in a case where the rigid member 13 and the device holding part 14 are not provided, there is a risk that the support rigidity of the electric AT device 12 with respect to the load F from above and the like is insufficient.

(2) The rigid member 13 serves as the duct member 22. Accordingly, the air-conditioning air passage 21 extending in the front and rear direction of a vehicle can be secured and formed between the inner surface of the side wall part 5 and the duct member 22. As a result, the air-conditioning air passage 21 can be provided inside the console body 6 with sufficient space efficiency by using the rigid member 13 for securing and improving the support rigidity of the electric AT device 12.

(3) The deposition rib 31 is provided in at least upper and lower edge portions of the duct member 22, and is subjected to vibration deposition to the inner surface of the side wall part 5 of the console body 6. Accordingly, the duct member 22 can be reliably and tightly fixed with necessary sealing performance to prevent air leakage.

The example discloses that the electric AT device 12 is mounted through the mounting bracket 11 on the lower surface side of the AT finisher 7. However, the present invention is not limited thereto, and the electric AT device 12 may be directly mounted on the lower surface side of the AT finisher 7 without using the mounting bracket 11. In this case, the device holding part 14 is provided in the electric AT device 12.

Hereinbefore, the example of the present invention has been described with reference to the drawings, but the example is merely an example of the present invention. Therefore, the present invention is not limited to any of the configurations of the example, and it is a matter of course that modification of the design and the like without departing from the spirit of the present invention is included in the present invention.

For example, in a case where each example includes a plurality of configurations, any possible combination of those configurations is of course included in the present invention even when there is no specific description. In a case where a plurality of examples and modified examples are disclosed as the present invention, any possible combination of the configurations covering those examples is of course included in the present invention even when there is no specific description. The configuration illustrated in drawings is of course included in the present invention even when there is no specific description.

In a case where the words "and/or the like" are used, those words are used to mean that the equivalent is included. In a case where the word such as "almost", "approximately", or "about" is used, the word is used to mean that what is within the commonsensically acceptable scope or accuracy is included in the present invention.

The present application claims priority from Japanese Patent Application No. 2014-110568 filed on May 28, 2014, the entire contents of which are hereby incorporated by reference. In addition, all references cited herein are incorporated as a whole.

DESCRIPTION OF REFERENCE NUMERALS AND SIGNS 1 center console
2 shift lever 5 side wall part
6 console body
7 AT finisher
11 mounting bracket
12 electric AT device
13 rigid member
14 device holding part
21 air-conditioning air passage
22 duct member
31 deposition rib

The invention claimed is:

1. A center console comprising:

a console body which has a pair of side wall parts; and an AT finisher which is provided between upper ends of the pair of side wall parts of the console body, wherein:

an electric AT device is mounted on a lower surface side of the AT finisher directly or through a mounting bracket;

a rigid member is mounted in at least one inner surface of the pair of side wall parts; and a device holding part which is supported by an upper portion of the rigid member is provided in the mounting bracket or the electric AT device.

2. The center console according to claim 1, wherein the rigid member serves as a duct member which forms an air-conditioning air passage extending in a front and rear direction of a vehicle between the duct member and the inner surface of the side wall part.

3. The center console according to claim 2, wherein the duct member has a deposition rib, which is capable of being subjected to vibration deposition with respect to the inner surface of the side wall part, in at least upper and lower edge portions.

* * * * *